United States Patent [19]

Grantham

[11] Patent Number: 5,148,840
[45] Date of Patent: Sep. 22, 1992

[54] HOSE ASSEMBLY HAVING A VENTURI SECTION WTIH A SLIDE MEMBER THEREIN AND METHOD OF MAKING THE HOSE ASSEMBLY

[75] Inventor: Rodger P. Grantham, Springfield, Mo.

[73] Assignee: Dayco Products, Inc., Dayton, Ohio

[21] Appl. No.: 797,637

[22] Filed: Nov. 25, 1991

Related U.S. Application Data

[60] Division of Ser. No. 709,031, May 31, 1991, Pat. No. 5,088,528, which is a continuation of Ser. No. 98,641, Sep. 18, 1987, abandoned.

[51] Int. Cl.$^5$ .............................................. B67D 5/06
[52] U.S. Cl. ........................................ 141/44; 141/1; 141/45; 141/46; 141/301; 141/59; 417/196
[58] Field of Search ....................... 141/44, 45, 46, 59, 141/302, 1; 417/196

[56] References Cited

U.S. PATENT DOCUMENTS

| | | | |
|---|---|---|---|
| 4,566,504 | 1/1986 | Furrow et al. | 141/59 |
| 4,570,686 | 2/1986 | Devine | 141/286 |
| 4,687,033 | 8/1987 | Furrow et al. | 141/59 |
| 4,749,009 | 6/1988 | Faeth | 141/45 |
| 4,827,987 | 5/1989 | Faeth | 141/59 |
| 4,842,027 | 6/1989 | Faeth | 141/45 |
| 4,951,720 | 8/1990 | Grantham | 141/44 |
| 4,967,809 | 11/1990 | Faeth | 141/59 |
| 5,005,613 | 4/1991 | Stanley | 141/45 |
| 5,040,576 | 8/1991 | Faeth | 141/45 |
| 5,042,537 | 8/1991 | Grantham | 141/59 |
| 5,056,569 | 10/1991 | Walker et al. | 141/44 |
| 5,088,528 | 2/1992 | Grantham | 141/44 |

FOREIGN PATENT DOCUMENTS 0155186  9/1985  European Pat. Off. .............. 141/45

Primary Examiner—Ernest G. Cusick
Attorney, Agent, or Firm—Joseph V. Tassone

[57] ABSTRACT

A hose assembly and method of making the same are provided, the hose assembly having a first fluid passage therein for conveying a volatile liquid in one direction to a container and a second fluid passage therein for returning the vapors of the volatile liquid from the container, the assembly comprising a flexible inner hose having an outer peripheral surface and defining the first fluid passage therein, and a flexible outer hose having an inner peripheral surface and being disposed around the inner hose, the inner peripheral surface of the outer hose and the outer peripheral surface of the inner hose defining the second fluid passage therebetween, the inner hose having a substantially straight Venturi section therein that tends to remove liquid from a certain area of the second fluid passage, the inner hose having adjacent intermediate ends, the Venturi section having opposed ends respectively interconnected to the ends of the inner hose to provide the first fluid passage therewith, the ends of the inner hose being respectively telescopically disposed on the opposed ends of the Venturi section, the Venturi section having a slide member therein to control an inlet port of the Venturi section.

12 Claims, 11 Drawing Sheets

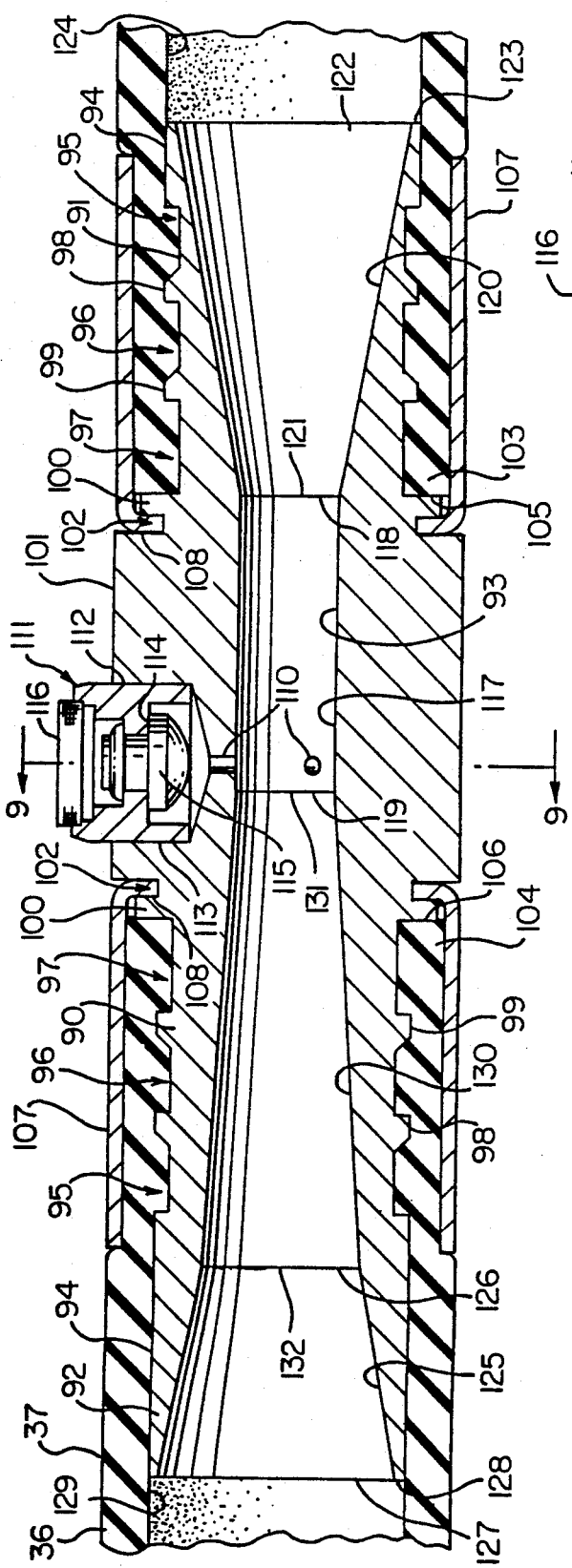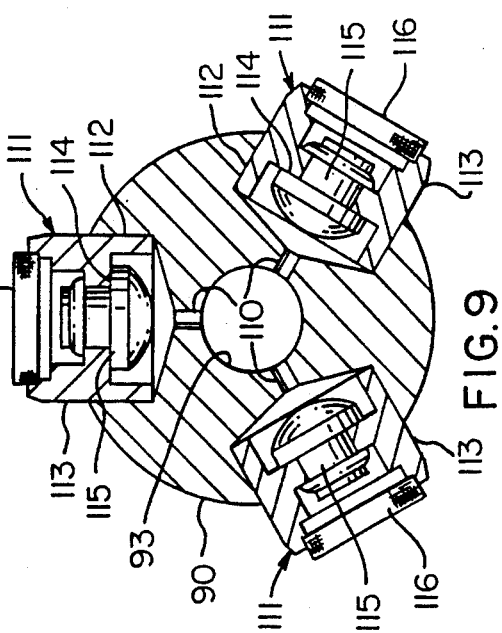

HOSE ASSEMBLY HAVING A VENTURI SECTION WTIH A SLIDE MEMBER THEREIN AND METHOD OF MAKING THE HOSE ASSEMBLY

CROSS REFERENCE TO RELATED APPLICATIONS

This application is a divisional patent application of its copending parent patent application, Ser. No. 709,031, filed May 31, 1991, now U.S. Pat. No. 5,088,528, which, in turn, is a continuation patent application of its copending parent patent application, Ser. No. 098,641, filed Sept. 18, 1987, now abandoned.

BACKGROUND OF THE INVENTION

1. Field of the Invention

This invention relates to a new hose assembly and to a new method of making such a hose assembly.

2. Prior Art Statement

It is known to provide a hose assembly having a first fluid passage therein for conveying a volatile liquid in one direction to a container and a second fluid passage therein for returning the vapors of the volatile liquid from the container, the assembly comprising a flexible inner hose having an outer peripheral surface and defining the first fluid passage therein, and a flexible outer hose having an inner peripheral surface and being disposed around the inner hose, the inner peripheral surface of the outer hose and the outer peripheral surface of the inner hose defining the second fluid passage therebetween, the inner hose having a substantially straight Venturi section therein that tends to remove liquid from a certain area of the second fluid passage, the inner hose having adjacent intermediate ends, the Venturi section having opposed ends respectively interconnected to the ends of the inner hose to provide the first fluid passage therewith. For example, see FIGS. 14, 15 and 16 of this application and the copending patent application of Glenn K. Walker et al, Ser. No 913,060 filed Sept. 29, 1986, now abandoned in favor of its continuation application Ser. No. 152,612, filed Feb. 5, 1988, now U.S. Pat. No. 5,056,569. Also, see the U.S. Pat. No. 4,749,009 to Faeth.

Also see the U.S. Pat. No. 4,687,033 to Furrow et al, for another arrangement wherein one end of an inner hose is telescopically disposed within one end of a straight Venturi section.

SUMMARY OF THE INVENTION

It is one feature of this invention to provide a new hose assembly wherein the effective length of the straight portion of the inner hose thereof is relatively short in order to permit the hose assembly to provide a desired drape when the hose assembly is installed on a conventional curbside gasoline pump or the like for dispensing gasoline therefrom to a gasoline tank of a transportation vehicle or the like.

In particular, it was found according to the teachings of this invention that the means for securing the substantially straight Venturi section in the inner hose of the aforementioned hose assembly of the copending patent application of Glenn K. Walker et al, Ser. No. 913,060, filed Sept. 29, 1986, creates a relatively long effective straight section in the inner hose of the hose assembly that not only prevents achieving a proper drape of the hose assembly when installed to a conventional curbside gasoline pump as will be apparent hereinafter, but also such an arrangement creates an abrupt transition for the fluid at the inlet and outlet ends of the Venturi section which is believed to reduce its efficiency.

Accordingly, it was found according to this invention that by eliminating the coupling joints of the prior known Venturi arrangement and utilizing the Venturi body or section itself as the coupling insert, not only is a smooth transition provided between the inner hose and the Venturi section but also a shorter effective length of the straight section of the inner hose results in a more proper drape of the hose assembly when installed to a conventional curbside gasoline pump or the like.

For example, one embodiment of this invention provides a hose assembly having a first fluid passage therein for conveying a volatile liquid in one direction to a container and a second fluid passage therein for returning the vapors of the volatile liquid from the container, the assembly comprising a flexible inner hose having an outer peripheral surface and defining the first fluid passage therein, and a flexible outer hose having an inner peripheral surface and being disposed around the inner hose, the inner peripheral surface of the outer hose and the outer peripheral surface of the inner hose defining the second fluid passage therebetween, the inner hose having a substantially straight Venturi section therein that tends to remove liquid from a certain area of the second fluid passage, the inner hose having adjacent intermediate ends, the Venturi section having opposed ends respectively interconnected to the ends of the inner hose to provide the first fluid passage therewith, the ends of the inner hose being respectively telescopically disposed on the opposed ends of the Venturi section.

Accordingly, it is an object of this invention to provide a new hose assembly having fluid passages therein for respectively conveying a volatile liquid in one direction to a container and returning vapors of the volatile liquid from the container, the hose assembly of this invention having one or more of the novel features of this invention as set forth above or hereinafter shown or described.

Another object of this invention is to provide a new method of making such a hose assembly, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 1 is a side view of the hose assembly of this invention being utilized for dispensing gasoline from a conventional curbside gasoline pump or the like to a nozzle means for insertion in the gasoline tank of a transportation vehicle or the like.

FIG. 8 is an enlarged fragmentary cross-sectional view taken on line 8—8 of FIG. 7.

FIG. 9 is a cross-sectional view taken on line 9—9 of FIG. 8.

FIGS. 12A and 12B, when placed end-to-end, provide an enlarged fragmentary cross-sectional view which illustrates how the inner hose of the hose assembly of this invention has the Venturi section thereof arranged in the drape of the hose assembly at a gasoline pump or the like.

DESCRIPTION OF THE PREFERRED EMBODIMENTS

Figure 1:
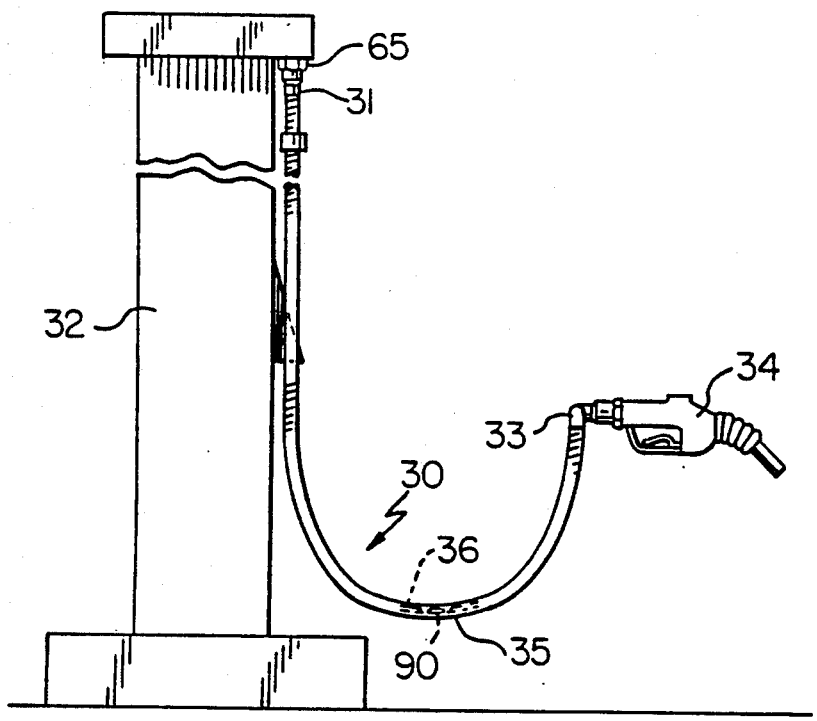

While the various features of this invention are hereinafter illustrated and described as being particularly adapted to provide a hose assembly for conveying volatile fluids, it is to be understood that the various features of this invention can be utilized singly or in various combinations thereof to provide a hose assembly for other purposes as desired.

Therefore, this invention is not to be limited to only the embodiments illustrated in the drawings, because the drawings are merely utilized to illustrate one of the wide variety of uses of this invention.

Referring now to FIG. 1, the new hose assembly of this invention is generally indicated by the reference numeral 30 and is shown in FIG. 1 as having one end 31 thereof interconnected to a conventional gasoline pump 32 or the like and the other end 33 thereof interconnected to a conventional dispensing nozzle 34 which is shown in a normal position for dispensing fuel into the gas tank or storage container of a transportation vehicle or the like (not shown) whereby an intermediate portion 35 of the hose assembly 30 provides a low portion or drape thereof from which any collected liquid therein is to be removed by the hose assembly 30 of this invention in a manner hereinafter set forth and for the reasons set forth in the aforementioned U.S. patent to Furrow et al, U.S. Pat. No. 4,687,033 whereby this patent is being incorporated into this disclosure by this reference thereto.

Figure 6:
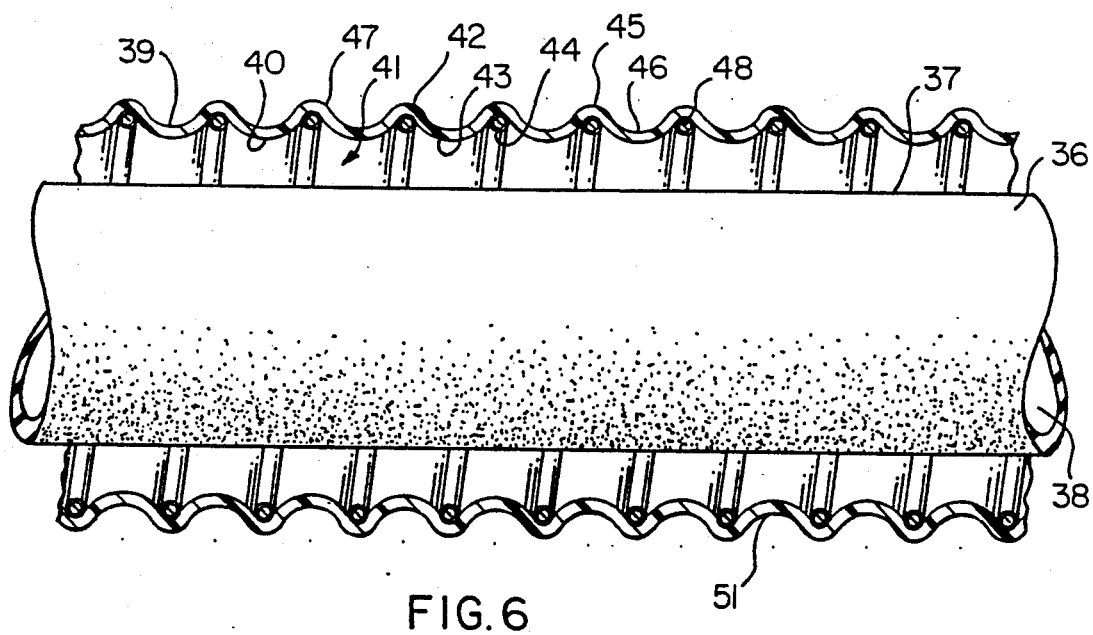
FIG. 6 is a fragmentary cross-sectional view illustrating certain parts of the hose assembly of this invention.

The hose assembly 30 of this invention as best illustrated in FIG. 6 and comprises a flexible inner hose 36 having an outer peripheral surface 37 and defining an inner fluid passage 38 therein through which the volatile liquid from the pump means 32 is adapted to be conveyed in a direction toward the nozzle construction 34 in a conventional manner. The hose assembly 30 also comprises a flexible outer hose 39 that has an inner peripheral surface 40 that cooperates with the outer peripheral surface 37 of the inner hose 36 to define an outer fluid passage 41 therebetween and through which vapors of the dispensed volatile liquid can be returned from the nozzle means 34 back to the pump means 32 in a manner conventional in the art such as set forth in the aforementioned U. S. patent to Furrow et al, U.S. Pat. No. 4,687,033, as well as in another U. S. patent to Furrow et al, U.S. Pat. No. 4,566,504 and the U. S. patent to Basham, U.S. Pat. No. 3,980,112 whereby these last two patents are also being incorporated into this disclosure by this reference thereto.

While the inner hose 36 has substantially smooth inner and outer peripheral surfaces, the main body portion 42 of the outer hose 39 is corrugated in a helical manner to define alternating crests 43 and valleys 44 on the inner peripheral surface 40 thereof as well as corresponding and alternating crests 45 and valleys 46 on the outer peripheral surface 47 thereof as illustrated in FIG. 6, each inner crest 43 and each inner valley 44 defining an arcuate surface 33' and 34' for a purpose hereinafter described.

In addition, the outer hose 39 has a reinforcing wire-like member 48 secured to the inner peripheral surface 40 thereof and also being disposed in a helical manner along the length of the body portion 42 of the outer hose 39, the wire reinforcing member 48 being formed of any suitable material, such as metallic material, and thereby rendering the outer hose 39 substantially resistant to inward crushing thereof about the inner hose 36 for a purpose hereinafter set forth. However, because the body portion 42 of the outer hose 39 is corrugated in the manner previously set forth, the outer hose 39 is relatively flexible.

While the body portion 42 of the outer hose 39 can be formed of any suitable material, one working embodiment thereof is formed by the method of providing a precurved metallic wire helix 49 (FIG. 12A) with an external urethane coating 50 thereon. Thereafter, an outer cover 51 of urethane is extruded over the coated reinforcing member 48 whereby the coating 50 thereon enhances the adhesion of the outer urethane material 51 to the reinforcing wire 48 while the resulting structure has the wire 49 effectively embedded therein. Of course, the body portion 42 of the outer hose 39 could be formed of different material and by a different method, if desired.

Figure 3:
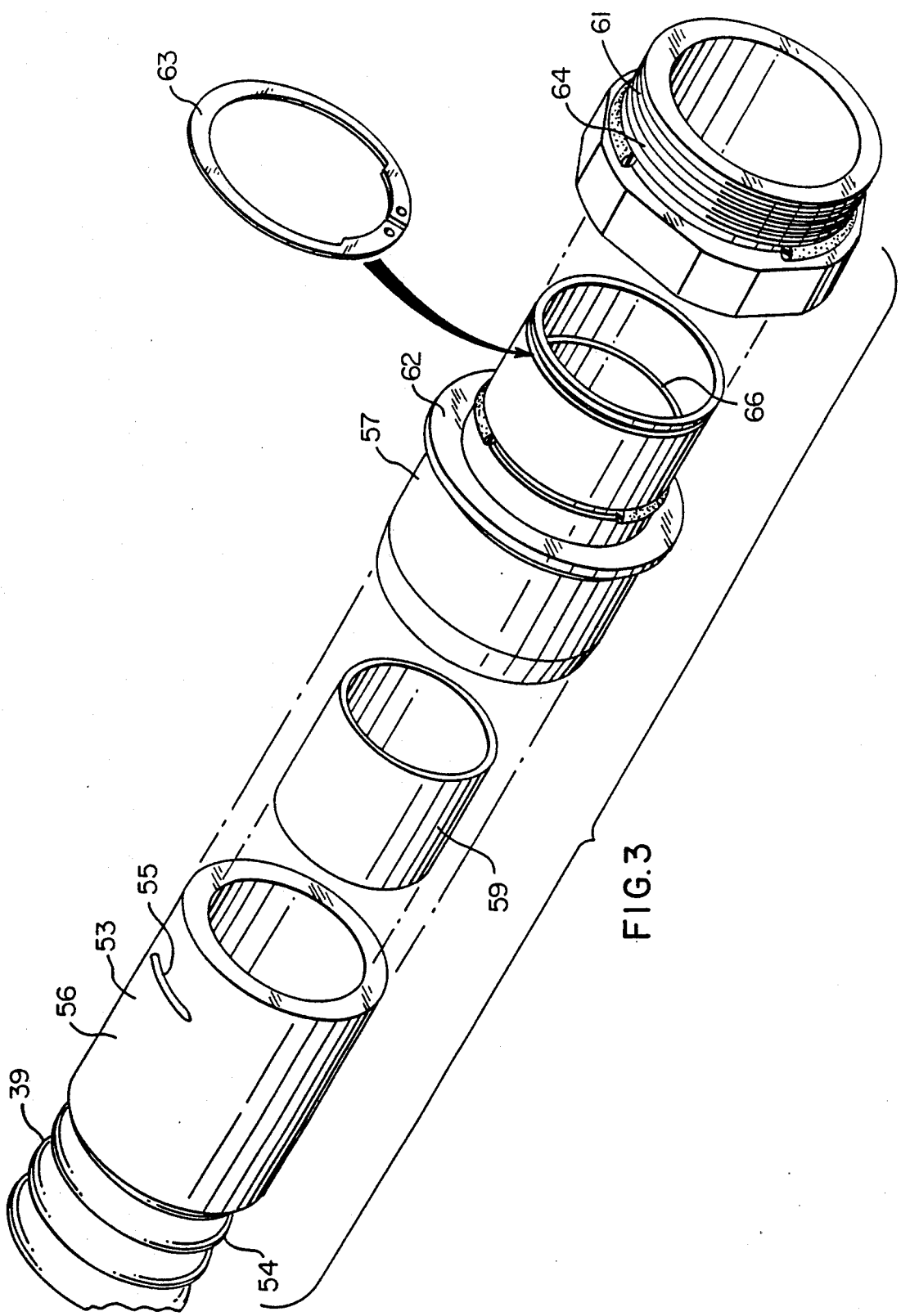
FIG. 3 is an exploded perspective view of the various parts of the end of the hose assembly of FIG. 2.
Figure 4:
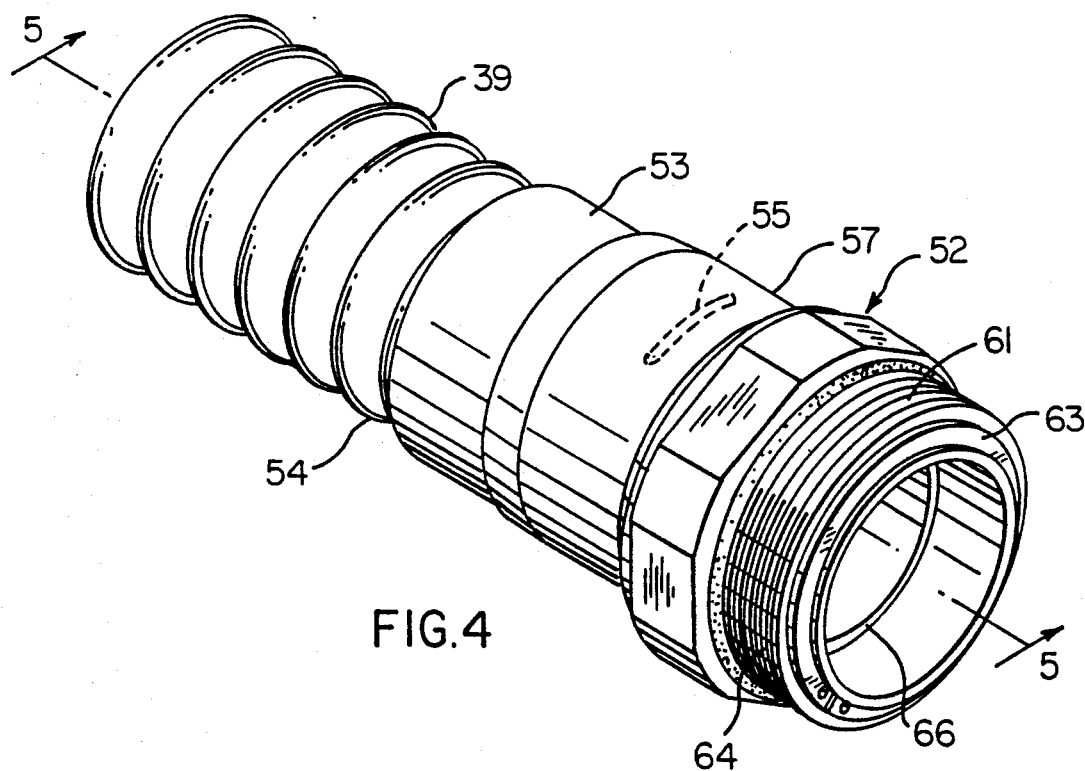
FIG. 4 is a perspective view illustrating the parts of FIG. 3 in their assembled relation.
Figure 5:
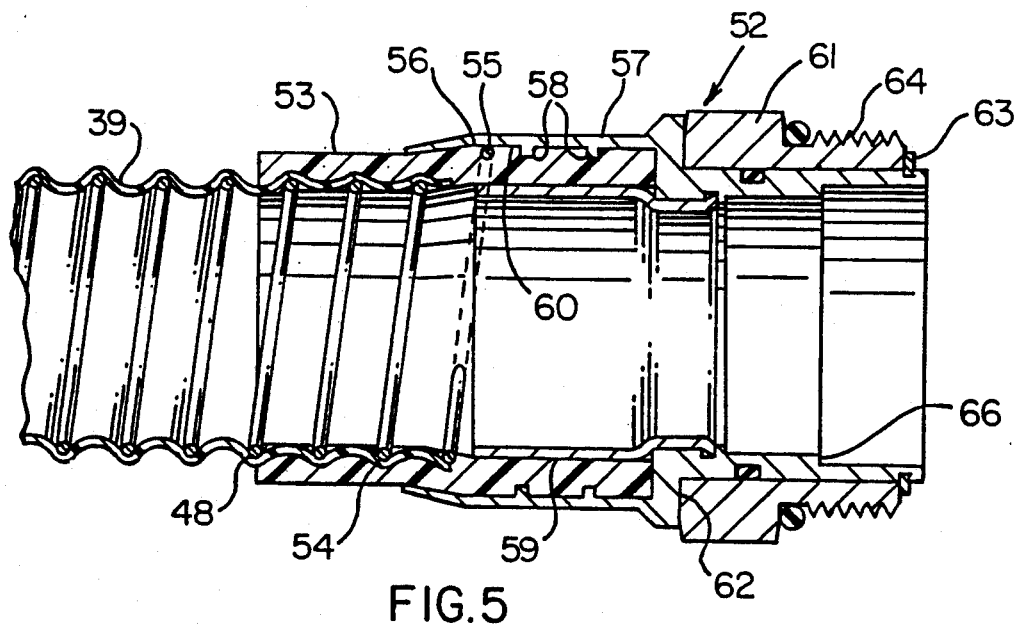
FIG. 5 is a fragmentary cross-sectional view taken on line 5—5 of FIG. 4.

In order to attach outer couplings 52 to the opposed ends of the body portion 42 of the outer hose 39, substantially smooth and nonreinforced cylindrical cuffs 53 of urethane are respectively bonded or molded to the opposed ends 54 of the outer hose 39 as illustrated in FIGS. 3 and 5 so that the cuffs 53 can be subsequently secured to the couplings 52 in any suitable manner, such as the manner set forth in the aforementioned U. S. patent to Basham, U.S. Pat. No. 3,980,112.

However, before the cuffs 53 are molded on the ends 54 of the outer hose 39, and end portion 55 of the reinforcing wire 48 at each end 54 of the outer hose 39 has the coating 50 thereon removed as well as the outer cover 51 so that the same will tend to extend outwardly beyond the outer peripheral surface 56 of the subsequently molded cuff 53 in the manner illustrated in FIG. 3 so as to provide an electrical connection between the opposed end couplings 52 of the hose assembly 30 for antistatic purposes.

In particular, each coupling 52 comprises an outer metal tubular coupling member 57 that is adapted to be telescoped over the respective cuff 53 and have a plurality of inwardly directed ribs 58 thereof embedded into the respective cuff 53 when an internally disposed metallic sleeve 59 is outwardly expanded within the coupling member 7 in the manner illustrated in FIG. 5 to hold the cuff 53 to the coupling 52, the bared end 55 of the wire 49 being maintained in electrical contact with the internal peripheral surface 60 of the metallic coupling member 57 in the manner illustrated in FIG. 5. In this manner, the wire 49 electrically interconnects the two end couplings 52 for the hose assembly 30.

Each coupling 52 includes a tubular member 61 rotatably disposed thereon between an annular shoulder 62 of the tubular member 57 and a split ring retainer 63 as illustrated in FIG. 5 whereby the member 61 can have external threads 64 thereof threaded to internal threads (not shown) so as to couple the coupling 52 to either the nozzle construction 34 or the coupling structure 65 of the pump 32 in a manner conventional in the art.

Figure 2:
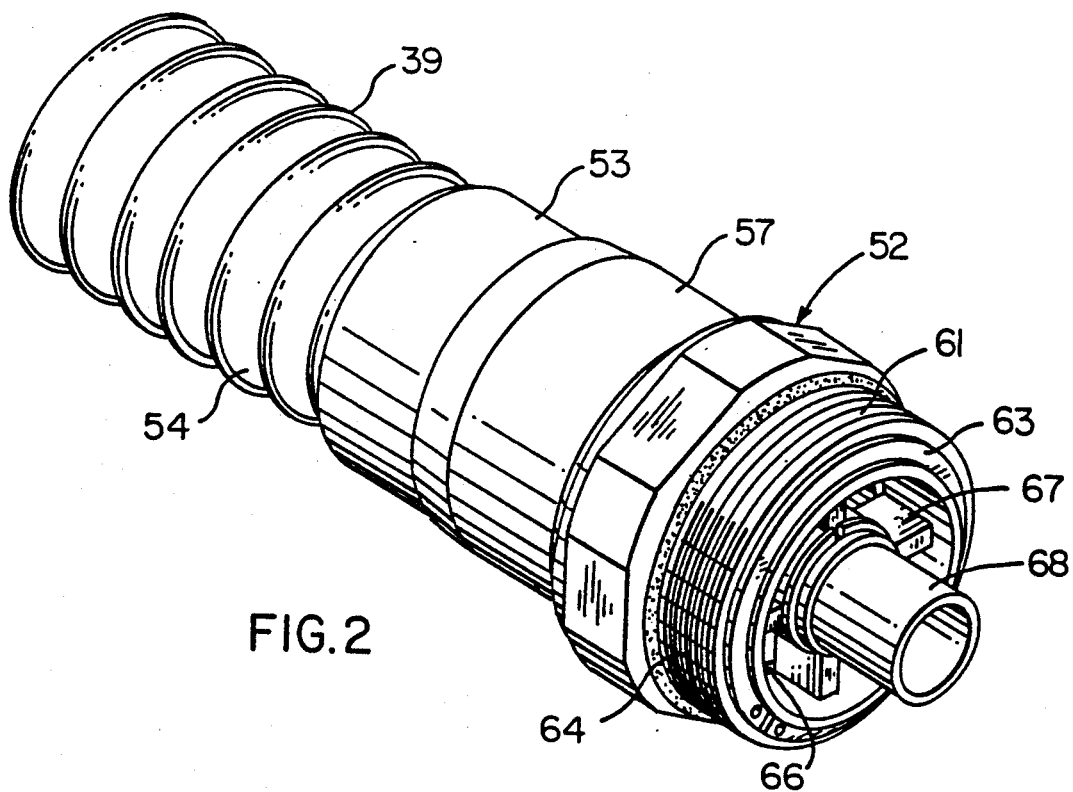
FIG. 2 is an enlarged fragmentary perspective view of one end of the hose assembly of this invention.

The tubular member 57 of the coupling 52 defines an internal annular shoulder 66 against which a clip means 7, FIG. 2, abuts so as to substantially concentrically mount an end fitting 68 of the inner hose 36 within the respective coupling 52 in substantially the same manner as I set forth in the aforementioned patent to Basham, U.S. Pat. No. 3,980,112. In this manner, each end of the inner hose 36 is supported by the end clip means 67 in the couplings 52 at the opposed ends of the outer hose 39 whereby the inner hose 36 is carried in the outer hose 39 to complete the hose assembly 30.

Since the coupling 52 and clip means 67 for the hose assembly 30 of this invention are fully disclosed and claimed in the aforementioned copending patent application of Glenn K. Walker et al, Ser. No. 913,060, a further discussion thereof is deemed unnecessary other than to state that when the hose assembly 30 is coupled to the nozzle construction 34 and to the gasoline pump 32 in the manner illustrated in FIG. 1, the fluid passage 38 in the inner hose 36 is adapted to direct volatile fuel from the pump means 32 to the nozzle 34 to be dispensed therefrom in a conventional manner while the second fluid passage 41 defined between the outer hose 39 and inner hose 36 is adapted to be utilized to return vapors from the dispensing operation at the nozzle construction 34 back to the pump means 32 for a vapor recovery purpose that is well known in the art.

It is also known, as fully described in the aforementioned U. S. patent to Furrow et al, U.S. Pat. No. 4,687,033, that liquid in the outer passage 41 of the hose assembly 30 tends to collect at the low point or drape area 35 of the hose assembly 30 as illustrated in FIG. 1 and it is known from others to include a Venturi section in the inner hose 36 so that the same can have its inlet means disposed in the passage means 41 at the drape area 35 for sucking the collected liquid from that drape area 35 and directing the same back into the inner fluid passage 38 of the inner hose 36 so as to be directed back to the nozzle 34 as the liquid face flows through the inner passage 38 from the pump means 32 and passes through the Venturi section to the nozzle construction 34.

As previously stated, it was found, according to the teachings of this invention that such an internal Venturi section as set forth in the aforementioned copending patent application of Glenn K. Walker et al, Ser. No. 913,060, resulted in the effective length of the straight portion of the inner hose of the hose assembly to be relatively long so that the drape area thereof cannot be bent by a user of the hose assembly 30 in properly dispensing fuel from the pump means 32 to that user's gasoline tank.

Figure 14:
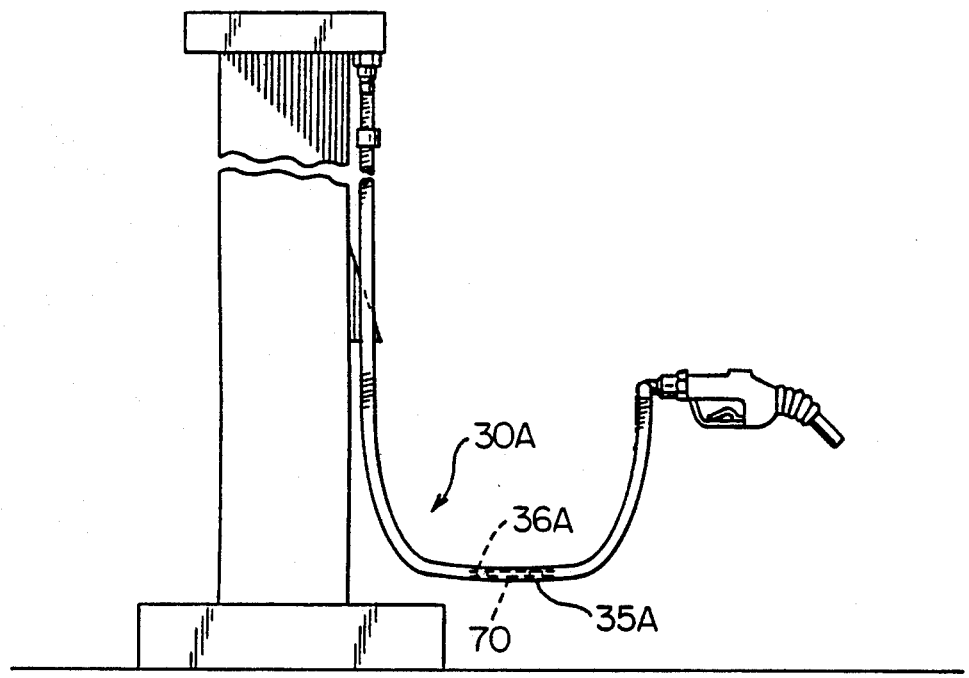
FIG. 14 is a view similar to FIG. 1 and illustrates the drape of the prior known hose assembly as set forth in the aforementioned copending patent application of Glenn K. Walker et al, Ser. No. 913,060, filed Sept. 29, 1986.

For example, reference is now made to FIG. 14 wherein the prior known hose assembly is generally indicated by the reference numeral 30A and the drape or low area 35A thereof is shown as having a relatively long straight section therein that is provided by the effective straight length of the Venturi section in the inner hose thereof.

Figure 15:
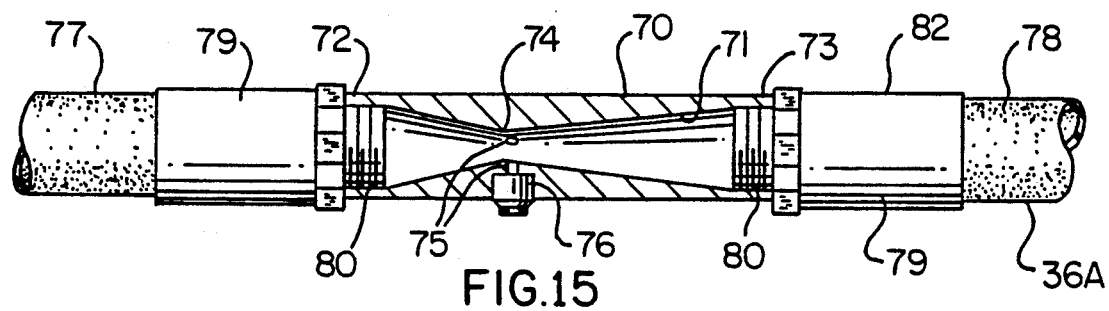
FIG. 15 is an enlarged fragmentary view, partially in cross section, of the Venturi portion of the inner hose of the prior known hose assembly of FIG. 14.
Figure 16:
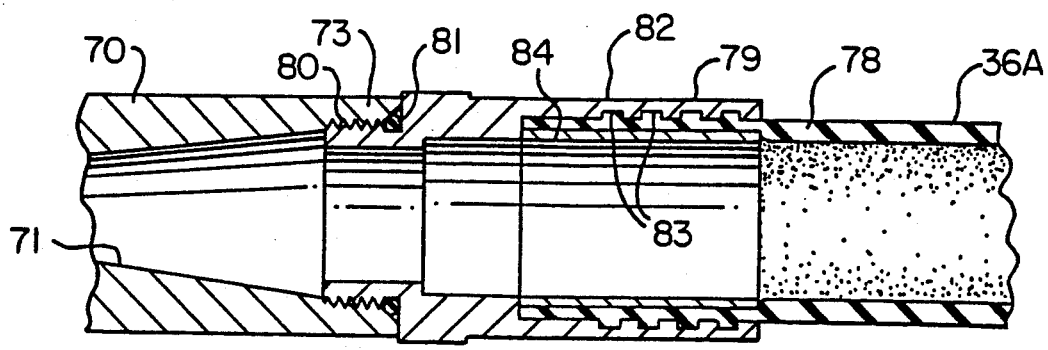
FIG. 16 is an enlarged fragmentary cross-sectional view of one end of the Venturi section and the inner hose of FIG. 15.

In particular, such prior known hose assembly 30A has the inner hose 36A thereof, as illustrated in FIGS. 15 and 16, provided with a straight Venturi section 70 that is formed of metallic material and has a flow passage 71 passing therethrough and through the opposed ends 72 and 73 thereof. The flow passage 71 has a reduced throat area 74 which communicates with a plurality of port means 75 that extend substantially radially outwardly to communicate with the outer flow passage in the hose assembly (not shown) to draw any liquid contained therein into the throat portion 74 and, thus, into the flow passage 71 for the reasons previously set forth. Each port means 75 has a one-way check valve means 76 disposed therein so as to prevent liquid from flowing from the Venturi section 70 outwardly through the port means 75.

The opposed ends 72 and 73 of the Venturi section 70 are respectively interconnected to adjacent end portions 77 and 78 of the inner hose 36A by like coupling members 79. As illustrated in FIG. 16, each coupling member 79 has an externally threaded end 80 that threads into the adjacent internally threaded end 73 of the Venturi section 70 and is sealed thereto by suitable sealing means 81. The respective coupling member 79 is in turn interconnected to its adjacent end 78 of the inner hose 36A by having that end 78 telescoped within a tubular portion 82 of the coupling member 79 and being outwardly radially compressed into annular grooves 83 formed internally in the tubular portion 82 by an expanded metallic sleeve 84.

However, it was found that such a coupling arrangement for the Venturi section 70 created a straight length in the inner hose 36A that was approximately 5.585 inches that resulted in the substantially straight unbendable section 35A in the hose assembly 30A as illustrated in FIG. 14.

Accordingly, it was found according to the teachings of this invention that the adjacent ends of the inner hose could be telescoped onto adjacent ends of the Venturi section so as to reduce the overall effective straight length of the Venturi portion of the inner hose as well as to provide a smooth transition between the inner hose and the Venturi section.

Figure 7:
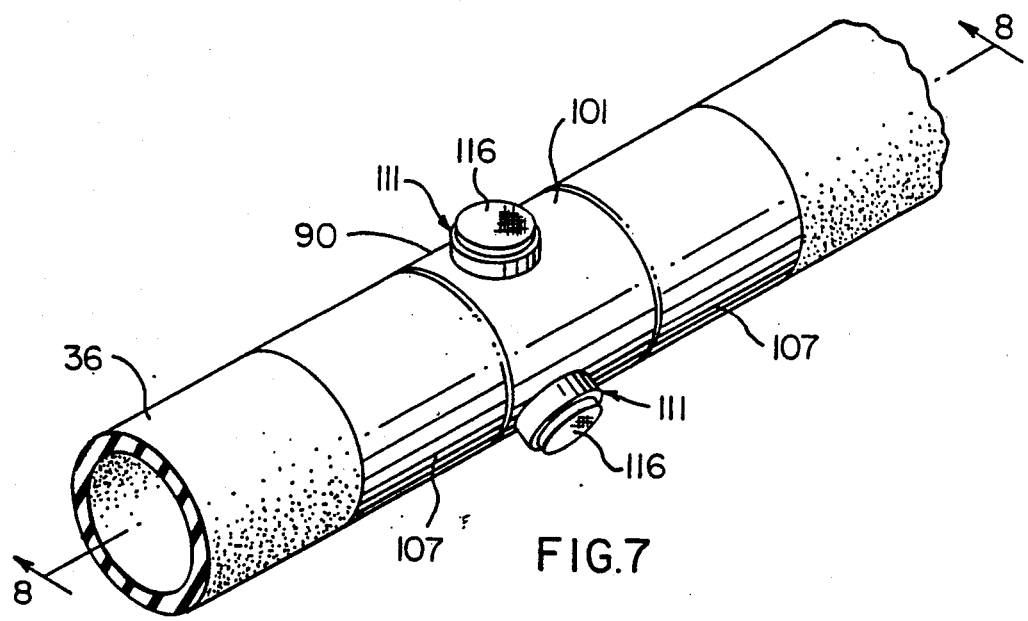
FIG. 7 is a fragmentary perspective view illustrating the Venturi section of the inner hose of the hose assembly of this invention.

For example, reference is now made to FIGS. 7 and 8 wherein the new Venturi section of this invention is generally indicated by the reference numeral 90 and comprises a substantially cylindrical block of metallic material having opposed ends 91 and 92 through which a flow passage 93 extends with the flow passage 93 being uniquely arranged in a manner hereinafter set forth.

Each end 91 and 92 of the Venturi section 90 has an end cylindrical portion 94 with the end cylindrical portion 94 at the end 92 being longer than the end cylindrical portion 94 at the inlet end 91 of the Venturi section 90 for a purpose hereinafter described. However, each end 91 and 92 has three annular grooves 95, 96 and 97 formed therein which respectively define intermediate outwardly directed annular rib-like portions 98 and 99 as illustrated. In addition, each end 91 and 92 has an outwardly directed annular flange 100 that cooperates with an intermediate enlarged cylindrical body portion 101 to define an annular groove 102 therewith, each flange 100 extending outwardly beyond the ribs 98 and 99 as well as its respective end cylindrical portion 94 as illustrated. Therefore, it can be seen that the Venturi section 90 has a substantially circular cross-sectional configuration throughout the length thereof with the diameter thereof varying as illustrated.

Figure 10:
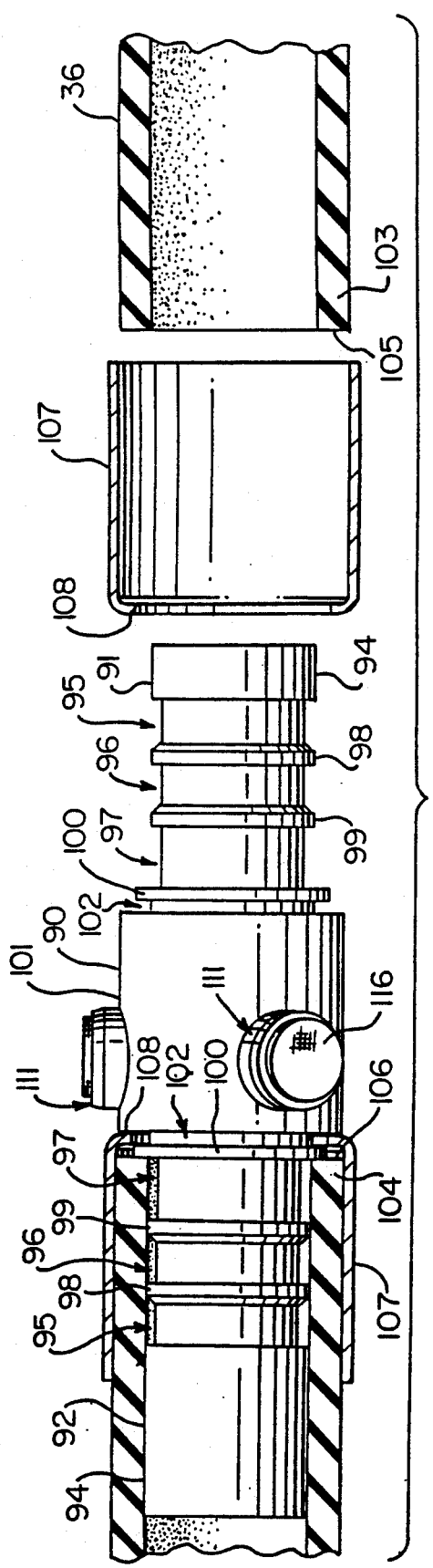
FIG. 10 is a reduced exploded view of the parts of the Venturi portion of the hose assembly of this invention before the same have been assembled together.
Figure 11:
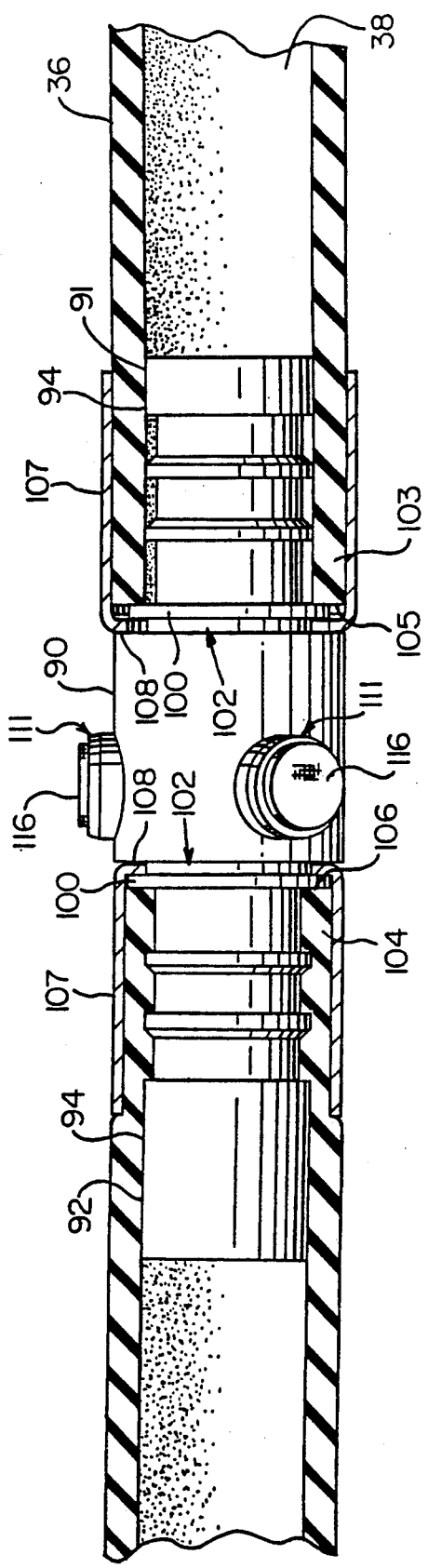
FIG. 11 is a view similar to FIG. 10 and illustrating how the parts of the assembly of FIG. 10 are secured together.

The inner hose 36 has adjacent ends 103 and 104 adapted to be respectively telescopically disposed over the ends 91 and 92 of the Venturi section 90 as illustrated and having the respective end surfaces 105 and 106 therewith abut against the respective flanges 100 so as to limit the degree of insertion of the ends 103 and 104 on the respective ends 91 and 92 of the Venturi section 90. However, either before or at the same time the ends 103 and 104 of the inner tubular member 36 are being telescoped over the ends 91 and 92 of the Venturi section 90, substantially cylindrical metal sleeves 107 are telescoped over the ends 91 and 92 of the Venturi section 90 illustrated in FIGS. 10 and 11 with each sleeve 107 having an initially inwardly turned annular flange 108 that is of a size that permits the same to readily slip over its adjacent flange 100 and be aligned with its annular groove 102 as illustrated to the right in FIG. 11, the internal diameter of the inner hose 36 being substantially the same as the outer diameter of the cylindrical part 94 and ribs 98 and 99 of the respective end 91 or 92 of the Venturi section as illustrated by the right-hand portion of FIG. 11.

Thereafter, the sleeves 107 are radially inwardly compressed in any suitable manner, such as in the manner set forth in the U. S. Pat. No. 4,625,539, which patent is being incorporated into this disclosure by this reference thereto, whereby each radially inwardly compressed sleeve 107 radially inwardly compresses the respective end 103 or 104 of the inner hose 36 into the annular grooves 95, 96 and 97 in the manner illustrated in FIG. 8 at the same time that the turned flange 108 of the sleeve 107 is received into the annular groove 102 to hold the collapsed sleeve 107 on the Venturi section 90. It can be seen in FIG. 8 that the outer peripheral surface of each radially inwardly compressed sleeve 107 is substantially coplanar with the external peripheral surface 37 of the inner tubular member 36 as illustrated.

In this manner, it can be seen that the effective overall length of the straight Venturi portion of the inner hose 36 can be reduced over the effective straight length of the Venturi portion of the prior known arrangement illustrated in FIG. 15 because the effective straight length of the Venturi portion illustrated in FIG. 8 is approximately only 3.475 inches whereas the effective straight length of the Venturi portion illustrated in FIG. 16 is approximately 5.585 inches.

Figure 12A:
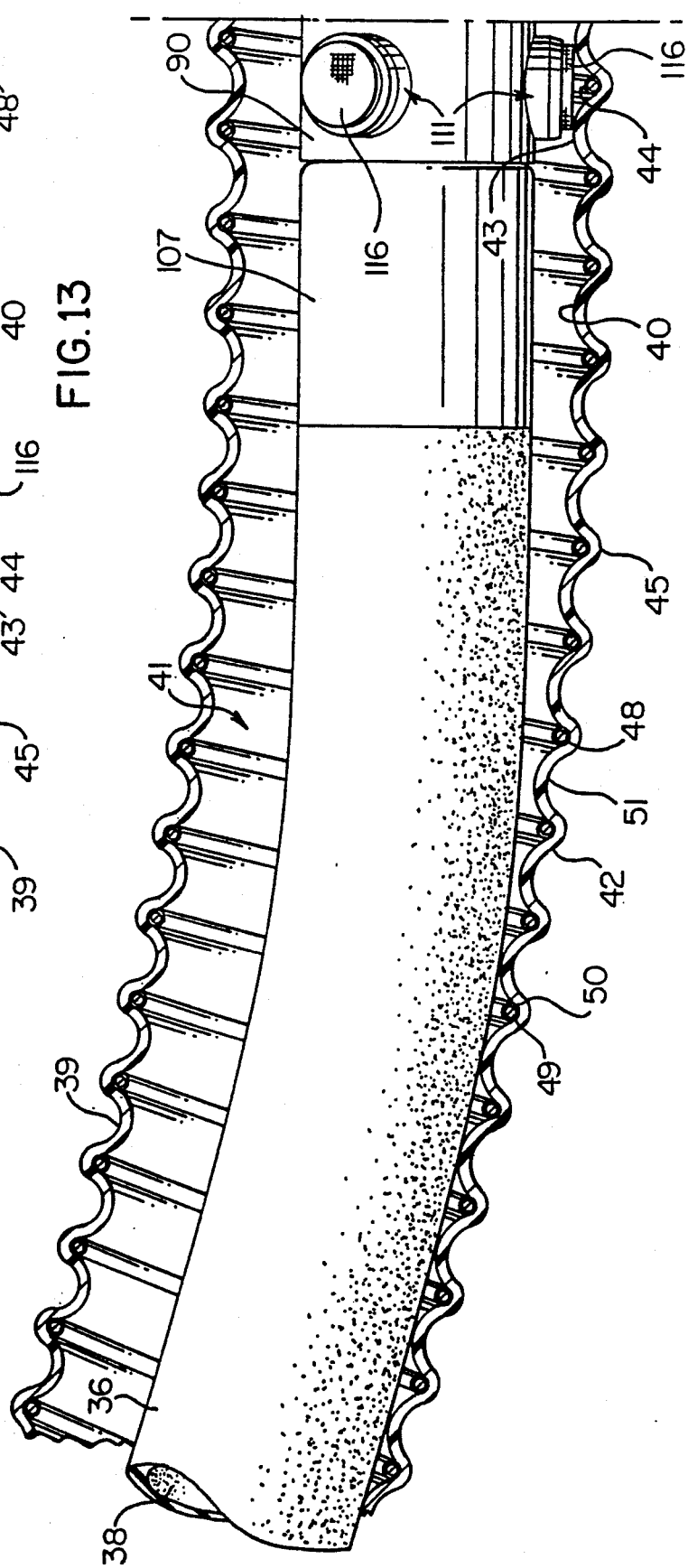
Figure 12B:
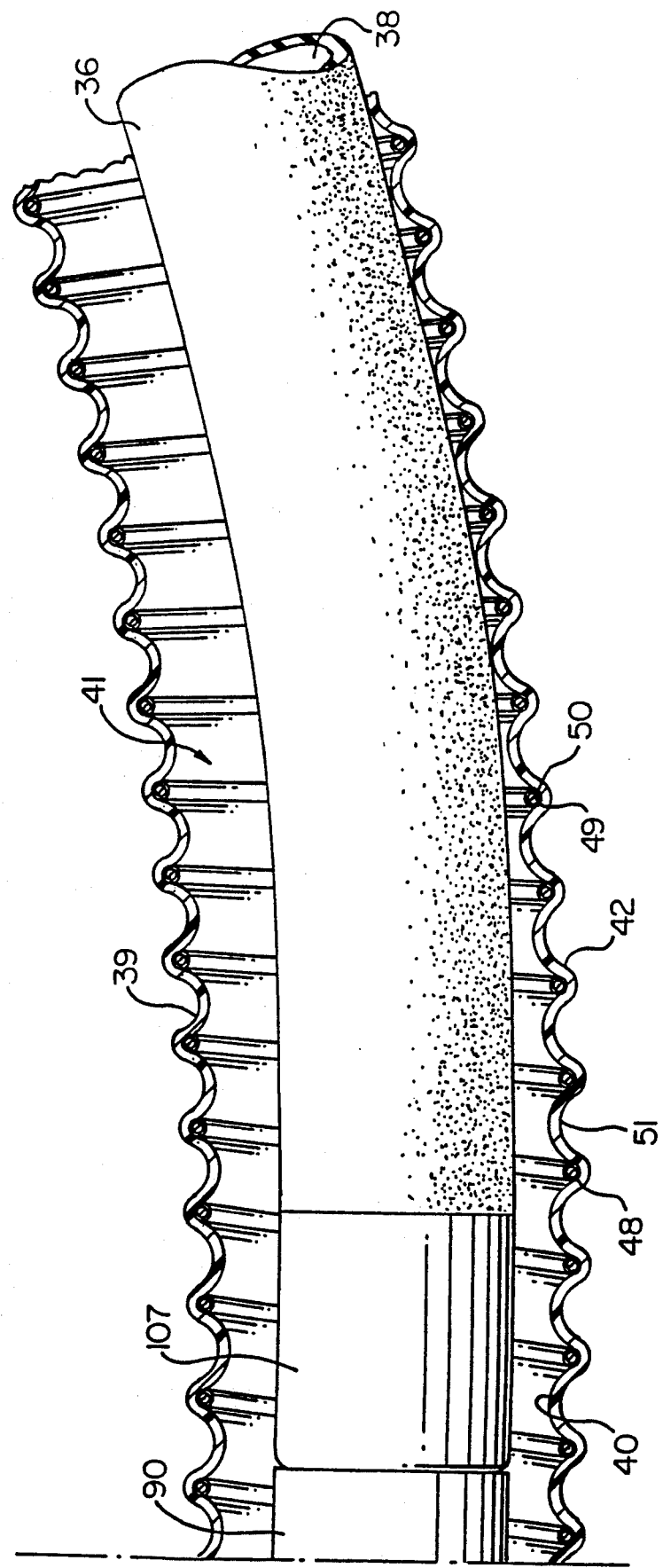

In this manner, such shortened effective straight length of the inner hose 36 permits the inner hose 36 to be disposed with a more curved draped portion 35 of the hose assembly 30 when the same is assembled to the pump 32 and nozzle 34 and the nozzle 34 is being disposed in the dispensing position illustrated in FIG. 1 and in the manner illustrated in FIGS. 12A and 12B.

The enlarged central portion 101 of the Venturi section 90 has a plurality of radially disposed port means 110 formed therethrough and leading to the fluid passage 93 through the Venturi section 90 at one end thereof and to the exterior of the Venturi section 90 at the other end thereof so as to communicate with the fluid passage 41 to suck any liquid fuel contained therein from the low portion or drape 35 of the hose assembly 30 as previously set forth. However, a plurality of one-way check valve means 111 are disposed in the port means 110 in enlarged outer ends 112 thereof, the check valve means 111 each comprising a tubular housing means 113 having an internal valve seat 114 therein that is adapted to be opened and closed by a one-way umbrella type check valve member 115 carried by the housing means 113.

Each check valve means 111 includes a substantially flat disc-like filter member 116 that defines an inlet for the respective port means 110 so as to filter any fluid flow therethrough which will be created by the fluid flow through the passage means 93 from the end 91 thereof to the end 92 thereof in a manner well known in the Venturi art so that the fluid flow through the inlet 116 opens the umbrella valve member 115 and permits the liquid to flow through the port means 110 to the flow passage 93 as previously set forth and be entrained in the fuel flow therethrough.

The port means 110 in the Venturi section 90 are disposed in a uniformly spaced apart circular array thereof as illustrated in FIG. 9 so that in any position of the Venturi section 90 in the hose assembly 30, at least one of the port means 110 will be below the center line of the Venturi block 90 so as to remove liquid from the lowest portion of the drape 35 of the hose assembly 30.

Figure 13:
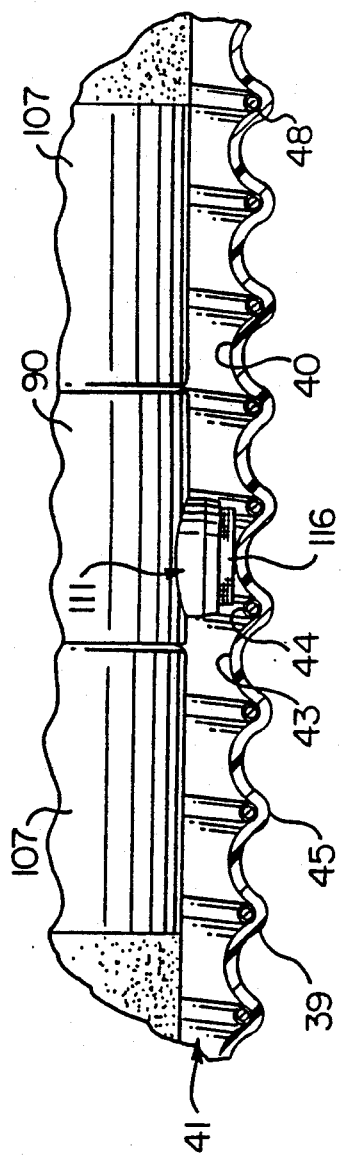
FIG. 13 is a fragmentary view similar to FIG. 12A and illustrating the Venturi section in another operating position thereof in the hose assembly.

As set forth in the aforementioned copending patent application of Glenn K. Walker et al, Ser. No. 913,060, filed Sept. 29, 1986, the size of the inlets 116 and the size of the internal crests and valleys 43 and 44 is such that even though one of the port means 116 is pointing directly downwardly so as to engage against the internal peripheral surface 40 of the outer hose 39 in the manner illustrated in FIG. 12A or 13, wherein the inlet 116 is bridging a valley 44 in FIG. 12A or engaging against a crest 43 as illustrated in FIG. 13, that inlet 116 is not blocked by the internal peripheral surface 40 because of the size of the crests and valleys 43 and 44 and the size of the particular inlet 116.

In particular, in one working embodiment of the hose assembly 30 of this invention, the diameter of the inlet or filter means 116 is approximately 0.318 of an inch, the maximum diameter of the Venturi section 90 at the inlets 116 that describes a circle is approximately 1.070 inches, the inside diameter of the outer hose 39 at the crests 43 thereof is approximately 1.250 inches, the inside diameter at the valleys 44 thereof is approximately 1.300 inches, the outside diameter of the hose 39 at an external crest 45 is approximately 1.500 inches, the pitch between adjacent turns of the wire reinforcing means 48 is approximately 0.333 of an inch, the thickness of the wall covering 51 is approximately 0.040 of an inch, the diameter of the wire means 48 is approximately 0.060 of an inch as the wire 49 has a diameter of approximately 0.050 of an inch and the thickness of the covering 50 on the wire 49 is approximately 0.005 of an inch, the outside diameter of the inner hose 36 is approximately 0.900 of an inch and the inside diameter is approximately 0.625 of an inch with the inner hose 36 being formed of nitrite rubber that is internally reinforced with a wire braid or a cloth braid, and, as previously set forth, the length of the Venturi section 90 is approximately 3.475 of an inch.

The flow passage 93 through the Venturi section 90 is uniquely arranged so as to define an intermediate cylindrical portion 117 that has opposed ends 118 and 119 with a substantially uniform circular transverse cross-sectional configuration throughout the length thereof, the ports 110 interrupting the cylindrical portion 117 closely adjacent the downstream end 119 thereof as illustrated in FIG. 8.

The flow passage 93 of the Venturi section 90 defines an inlet portion 120 that is substantially frusto-conical with its smaller base 121 joining the end 118 of the cylindrical portion 117 and having substantially the same diameter therewith, the larger base 122 of the frusto-conical portion 120 interrupting the end surface 123 of the Venturi section 90 at a point closely adjacent the internal peripheral surface 124 of the inner hose 36 as illustrated.

An outlet frusto-conical portion 125 is formed by the passage 93 at the end 92 of the Venturi section 90 with the frusto-conical portion 125 having a small base 126 and a large base 127 with the large base 127 interrupting the end surface 128 of the Venturi section 90 so as to be disposed closely adjacent the internal peripheral surface 129 of the inner hose 36 as illustrated.

Another frusto-conical portion 130 is formed by the passage 93 in the Venturi section 90 intermediate the cylindrical portion 117 thereof and the outlet frusto-conical portion 125, the frusto-conical portion 130 having a smaller base 131 thereof joining the end 119 of the cylindrical portion 17 and being substantially of the same diameter therewith while the larger base 132 of the frusto-conical portion 130 joins the smaller base 126 of the end frusto-conical portion 25 and has substantially the same diameter therewith.

In the previously described working embodiment of the Venturi section 90 of this invention, the section 90 is formed of aluminum, the length of the cylindrical portion 17 is approximately 0.755 of an inch with a diameter of approximately 0.225 of an inch, the length of the inlet frusto-conical portion 120 is approximately 0.960 of an inch with the larger base 122 thereof having a diameter of approximately 0.600 of an inch so that the angle being defined by the frusto-conical portion 120 is approximately 22°, the intermediate frusto-conical portion 130 has a length of approximately 1.420 inches with the larger base 131 thereof defining a diameter of approximately 0.405 of an inch so that the same makes an angle of approximately 7°, and the outlet frusto-conical portion 125 has a length of approximately 0.355 of an inch with the larger base 127 thereof having a diameter of approximately 0.600 of an inch so that the same defines an angle of approximately 31°.

It was found according to the teachings of this invention that the aforementioned working embodiment of the Venturi section 90 provided for a smooth transition of the flow of fuel from the inlet end 103 of the inner hose 36 through the flow passage 93 and by having the two-stage exit frusto-conical portions 130 and 125, the initial gradual 7° angle of the first frusto-conical portion 130 seems to prevent flow separation before the fluid expands outwardly into the outlet frusto-conical portion 125 so as to tend to help to prevent "movement" of the low pressure location of the pressure drop in the cylindrical portion 116 that performs the sucking function as previously set forth. Also, it has been found that the cylindrical portion 117 can have an increased diameter over the diameter of the prior known Venturi section (0.225 versus 0.218) so as to reduce pressure drop therethrough which allows for higher flow rates to the nozzle construction 34 by the pump means 32.

Therefore, it can be seen that in the operation of the hose assembly 30 of this invention, whenever an operator dispenses fuel out of the nozzle construction 34 into a gasoline tank or the like, the Venturi section 90 will be located in the lowest portion or drape 35 of the hose assembly 30 and because of the flow of fuel through the flow passage 93 of the Venturi section 90, a vacuum is created in the port means 110 which tends to draw any liquid that is collected in the outer passage 41 of the hose assembly 30 in the drape or low area 35 thereof into the fuel flowing through the flow passage 93 so as to remove the same from blocking the flow passage 41 which returns the vapors to the pump means 32 in a manner conventional in the art.

In addition, it can be seen that because the straight portion of the Venturi section 90 is the only part that requires the inner hose 36 to be substantially straight in the low area 35 of the hose assembly 30, the hose assembly 30 can have the drape or low area 35 thereof relatively arcuate in contrast to the nonarcuate low portion of the prior known hose assembly arrangement illustrated in FIG. 14.

Therefore, it can be seen that this invention not only provides a new hose assembly but also this invention provides a new method for making such a hose assembly.

While certain dimensions have been previously set forth in regards to one working embodiment of the hose assembly 30 of this invention, it is to be understood that the dimensions given are merely for an example of one working embodiment of this invention and it is not to be a limitation on the claims of this invention.

Further, while a certain umbrella type of one-way check valve has been provided for the port means 110 of the Venturi section 90 of this invention, it is to be understood that other structure can be utilized for blocking flow through the port means of the Venturi section when the Venturi section is not providing a sufficient suction.

Figure 17:
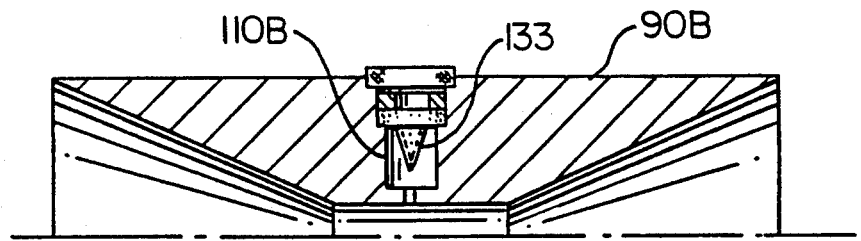
FIG. 17 is a cross-sectional view of another Venturi section of this invention.

For example, reference is now made to FIG. 17 wherein another Venturi section of this invention is generally indicated by the reference numeral 90B and it can be seen that the port means 110B thereof has a duckbill-type of one-way check valve means 133 disposed therein rather than the umbrella type of check valve means 115 previously described.

Figure 18:
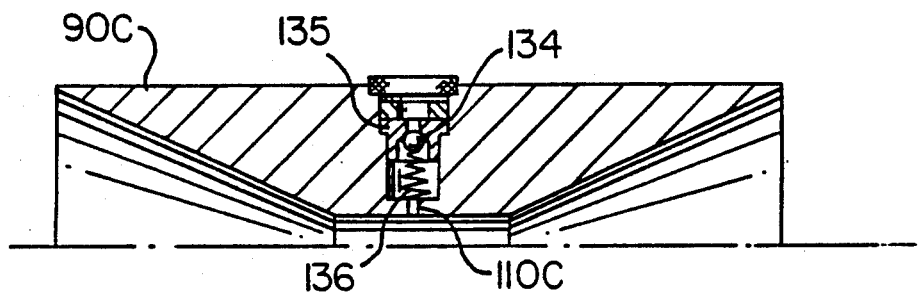
FIG. 18 is a view similar to FIG. 17 and illustrates another Venturi section of this invention.

Similarly, it can be seen in FIG. 18 that another Venturi section 90C of this invention has a one-way spring biased ball valve member 134 urged against a valve seat 135 by a compression spring 136 to provide for the one-way flow through the port means 110C.

Instead of a one-way check valve means, the Venturi section can be provided with a slide means which will open and close the port means thereof.

Figure 19:
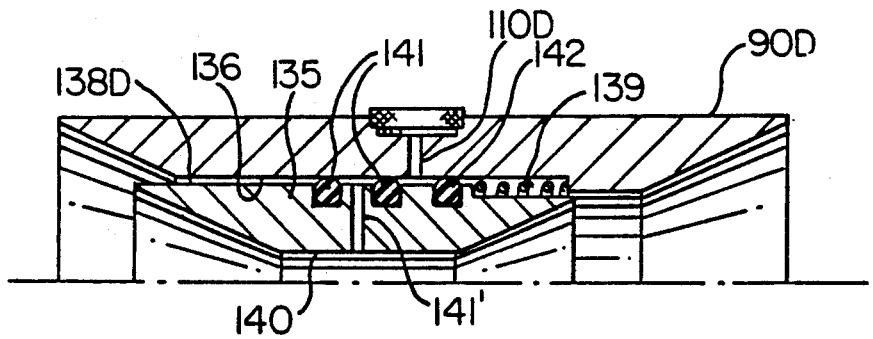
FIG. 19 is a view similar to FIG. 17 and illustrates another Venturi section of this invention, FIG. 19 illustrating the Venturi section in one operating position thereof.
Figure 20:
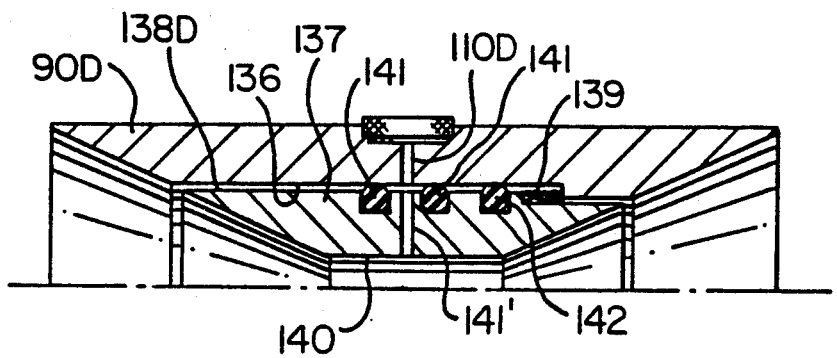
FIG. 20 is a view similar to FIG. 19 and illustrates the Venturi section in another operating position thereof.

For example, reference is now made to FIGS. 19 and 20 wherein another Venturi section of this invention is indicated by the reference numeral 90D and the same has a port means 110D leading to an internal peripheral surface 136 thereof. A movable tubular member 137 is disposed within the Venturi section 90D and has its external peripheral surface 138 disposed closely adjacent the internal peripheral surface 136 and is urged to the left in FIG. 19 by a compression spring 139. The member 137 has an internal Venturi-forming portion 140 that is interrupted by a port means 141 which will align with the port means 110D when the member 136 is moved to the right as illustrated in FIG. 20 by fluid flowing through the Venturi section 90D from left to right so that the aligned port means 110D and 140 can provide the passage for the suction created by the Venturi-forming portion 140 in a manner well known in the art, the member 137 carrying O-ring seal means 141 on opposite sides of the port 141' thereof so as to seal between the members 90D and 137 when the port means 141' is aligned with the port means 110D as illustrated in FIG. 20 while one of the seal means 141 cooperates with another seal means 142 to seal on opposite sides of the port 110D when the member 137 is disposed in its nonaligned condition illustrated in FIG. 19.

Figure 23:
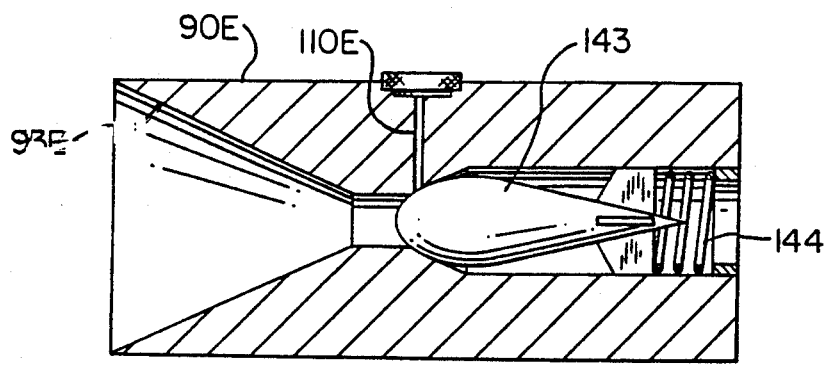
FIG. 23 is a view similar to FIG. 17 and illustrates another Venturi section of this invention.
Figure 24:
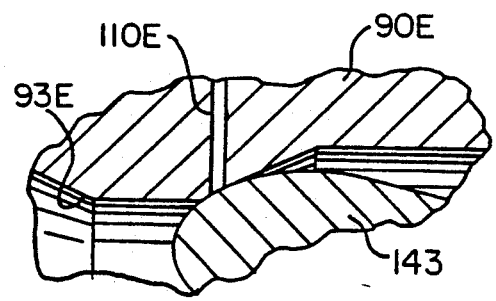
FIG. 24 is an enlarged fragmentary view of the Venturi section of FIG. 23 and illustrates the same in one operating position thereof.
Figure 25:
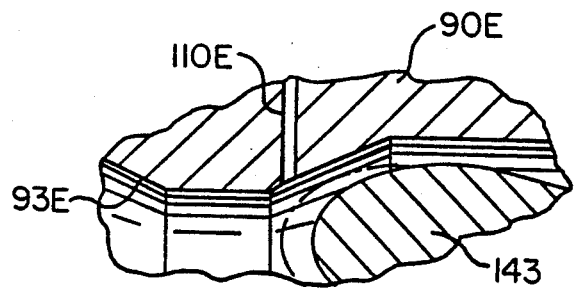
FIG. 25 is a view similar to FIG. 24 and illustrates the Venturi section in another operating condition thereof.

Another such movable member 143 is provided in FIGS. 23-25 and is utilized to open and close the port means 110E of a Venturi section 90E when the flow of fuel moves the member 143 against the force of a compression spring 144 upon flowing from left to right through the flow passage 93E thereof as illustrated in FIG. 25, the amount of opening of the member 143 away from the port means 110E being controlled by the amount of fuel flowing through the Venturi passage 93E.

Of course, in any of the Venturi sections of this invention, bypass passages could be provided therein to bypass some of the fuel flow through the Venturi section without utilizing that flow or fuel for creating the suction required to empty liquid from the passage of the hose assembly.

Figure 21:
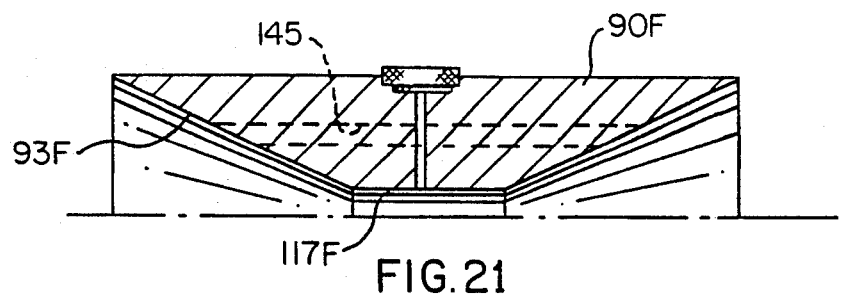
FIG. 21 is a view similar to FIG. 17 and illustrates another Venturi section of this invention.

For example, the Venturi section 90F illustrated in FIG. 21 has at least one bypass opening 145 passing therethrough so that fuel can flow through the passage 145 from left to right in FIG. 21 without passing through the throat portion 117F of the flow passage 93F and thereby permits a greater amount of fuel to flow through the Venturi section 90F than when the bypass passage 145 is not being utilized.

Figure 22:
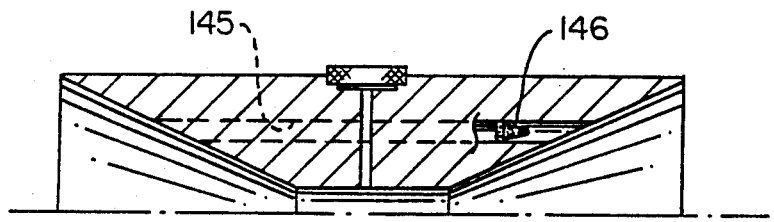
FIG. 22 is a view similar to FIG. 17 and illustrates another Venturi section of this invention.

If desired, the flow passage 145 could have a one-way check valve means disposed therein, such as the one-way check valve means 146 illustrated in FIG. 22.

In any event, it can be seen that various changes can be made in the structure of the Venturi section 90 of this invention with the Venturi section 90 still operating in substantially the same manner as the Venturi section 90 previously set forth.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a hose assembly having a first fluid passage therein for conveying a volatile liquid in one direction to a container and a second fluid passage therein for returning the vapors of the volatile liquid from the container, the assembly comprising a flexible inner hose having an outer peripheral surface and defining said first fluid passage therein, and a flexible outer hose having an inner peripheral surface and being disposed around said inner hose, said inner peripheral surface of said outer hose and said outer peripheral surface of said inner hose defining said second fluid passage therebetween, said inner hose having a substantially straight Venturi section therein that tends to remove liquid from a certain area of said second fluid passage, said inner hose having adjacent intermediate ends, said Venturi section having opposed ends respectively interconnected to said ends of said inner hose to provide said first fluid passage therewith, the improvement wherein said ends of said inner hose are respectively telescopically disposed on said opposed ends of said Venturi section, said Venturi section having a flow passage therethrough, said flow passage having an intermediate portion, said Venturi section having a radial passage leading from said second fluid passage to said intermediate portion of said flow passage, said Venturi section having a movable slide means in said flow passage thereof which is adapted to open said radial passage to said flow passage when the rate of the fluid flow through said flow passage is above a certain rate and to close said radial passage to said flow passage when the rate of the fluid flow through said flow passage is below said certain rate.

2. A hose assembly as set forth in claim 1 wherein fastening means fasten said ends of said inner hose on said opposed ends of said Venturi section.

3. A hose assembly as set forth in claim 2 wherein said fastening means each comprises a sleeve disposed in telescoping relation on its respective end of said inner hose.

4. A hose assembly as set forth in claim 3 wherein each said sleeve is disposed in radially inwardly compressed relation that holds its respective end of said inner hose in radially inwardly compressed relation on its respective end of said Venturi section.

5. A hose assembly as set forth in claim 4 wherein each end of said Venturi section has annular groove means therein and in which its respective inner hose end is compressed by its respective sleeve.

6. A hose assembly as set forth in claim 5 wherein each end of said Venturi section has an end annular groove, each sleeve having an inwardly directed annular flange received in said end annular groove of its respective Venturi section end.

7. In a method of making a hose assembly having a first fluid passage therein for conveying a volatile liquid in one direction to a container and a second fluid passage therein for returning the vapors of the volatile liquid from the container, the assembly comprising a flexible inner hose having an outer peripheral surface and defining said first fluid passage therein, and a flexible outer hose having an inner peripheral surface and being disposed around said inner hose, said inner peripheral surface of said outer hose and said outer peripheral surface of said inner hose defining said second fluid passage therebetween, said inner hose having a substantially straight Venturi section therein that tends to remove liquid from a certain area of said second fluid passage, said inner hose having adjacent intermediate ends, said Venturi section having opposed ends respectively interconnected to said ends of said inner hose to provide said first fluid passage therewith, the improvement comprising the steps of telescopically disposing said ends of said inner hose respectively on said opposed ends of said Venturi section, forming said Venturi section to have a flow passage therethrough, forming said flow passage to have an intermediate portion, forming said Venturi section to have a radial passage leading from said second fluid passage to said flow passage at said intermediate portion thereof, and forming said Venturi section to have a movable slide means in said flow passage thereof which is adapted to open said radial passage to said flow passage when the rate of the fluid flow through said flow passage is above a certain rate and to close said radial passage to said flow passage when the rate of the fluid flow through said flow passage is below said certain rate.

8. A method of making a hose assembly as set forth in claim 7 and including the step of fastening said ends of said inner hose on said opposed ends of said Venturi section with fastening means.

9. A method of making a hose assembly as set forth in claim 8 and including the step of forming said fastening means to each comprises a sleeve disposed in telescoping relation on its respective end of said inner hose.

10. A method of making a hose assembly as set forth in claim 9 and including the step of radially inwardly compressing each said sleeve to hold its respective end of said inner hose in radially inwardly compressed relation on its respective end of said Venturi section.

11. A method of making a hose assembly as set forth in claim 10 and including the step of forming each end of said Venturi section to have annular groove means therein and in which its respective inner hose end is compressed by its respective sleeve.

12. A method of making a hose assembly as set forth in claim 11 and including the steps of forming each end of said Venturi section to have an end annular groove, and forming each sleeve to have an inwardly directed annular flange to be received in said end annular groove of its respective Venturi section end.

* * * * *